United States Patent
Adams

[15] 3,677,285
[45] July 18, 1972

[54] DUCT ASSEMBLY UNIT FOR AIR-WATER INDUCTION SYSTEM OF AIR CONDITIONING IN MULTI-STORY BUILDINGS

[72] Inventor: Wade L. Adams, 735 Bowhill, Hillsborough, Calif. 94010

[22] Filed: April 6, 1971

[21] Appl. No.: 131,663

[52] U.S. Cl............................................137/357, 137/375
[51] Int. Cl......................................F16l 39/02, F17d 1/04
[58] Field of Search..................137/357, 360, 375; 138/111; 285/137

[56] References Cited

UNITED STATES PATENTS

| | | | |
|---|---|---|---|
| 2,037,895 | 4/1936 | Gugler | 137/357 X |
| 3,590,855 | 7/1971 | Woollen et al. | 137/375 |
| 3,618,622 | 11/1971 | Zien et al. | 137/357 X |

Primary Examiner—Henry T. Klinksiek
Attorney—Boyken, Mohler, Foster & Schwab

[57] ABSTRACT

A unit for conducting air and water in an induction system of air conditioning in a multi-story building comprising a modular assembly of water pipes and an air duct stationarily enclosed within a housing and heat insulated from each other and the walls of the housing with projecting terminal end portions on opposite ends of the pipes and duct provided with couplings for connecting adjacent terminal end portions of the water pipes and air ducts of adjacent units after the units are in longitudinal alignment. A support on each unit or module is adapted to support each unit on one floor of each adjacent pair of stories in the building in said longitudinal alignment in position for effecting the coupling between the pipes and air ducts of adjacent units while so supported, and each unit is provided with air and water take-offs for connecting with an induction unit in the space between the floors of each adjacent pair of stories. The projecting terminal end portions of the pipes and air ducts are preferably not threaded and the couplings therefor are longitudinally extensible elements, with the coupling for the air ducts secured on one terminal end portion of each unit for said extension to connect with the duct on the adjacent unit or module.

6 Claims, 6 Drawing Figures

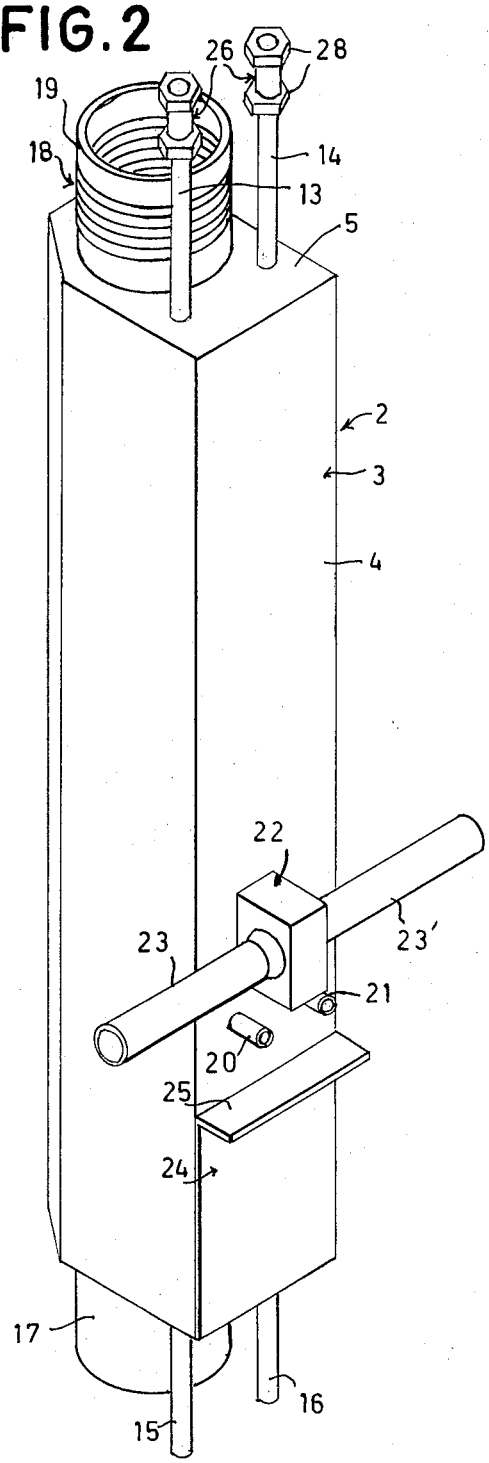
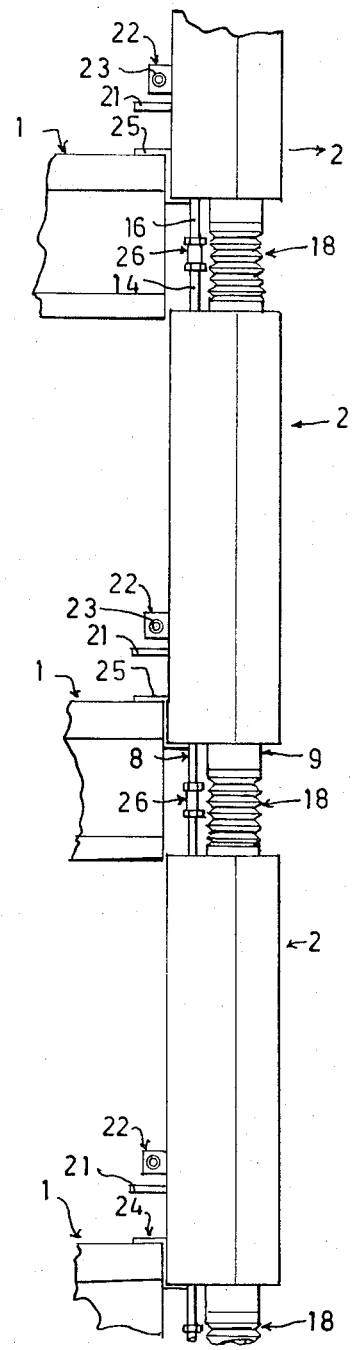
FIG. 2
FIG. 1
INVENTOR.
WADE L. ADAMS
BY
Boykin, Mohler, Foster & Selvah
ATTORNEYS

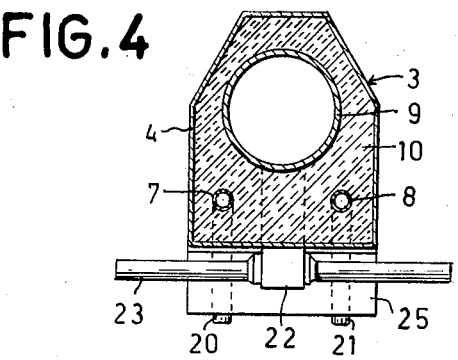
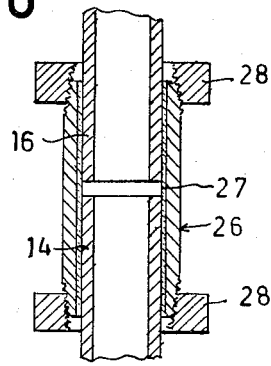
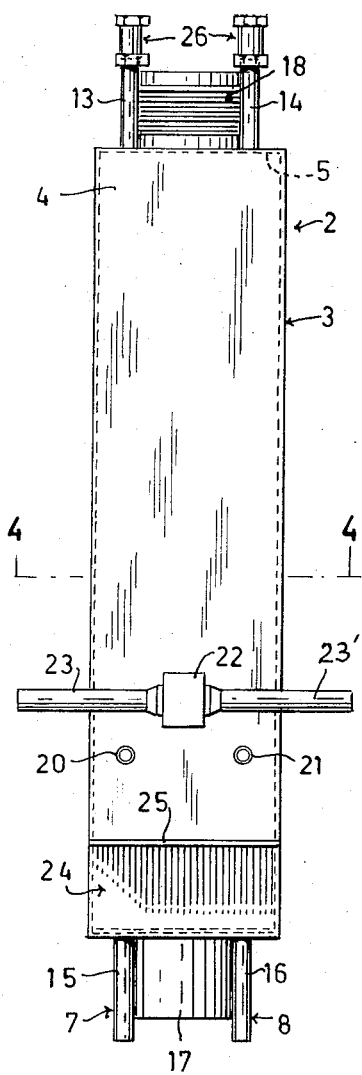
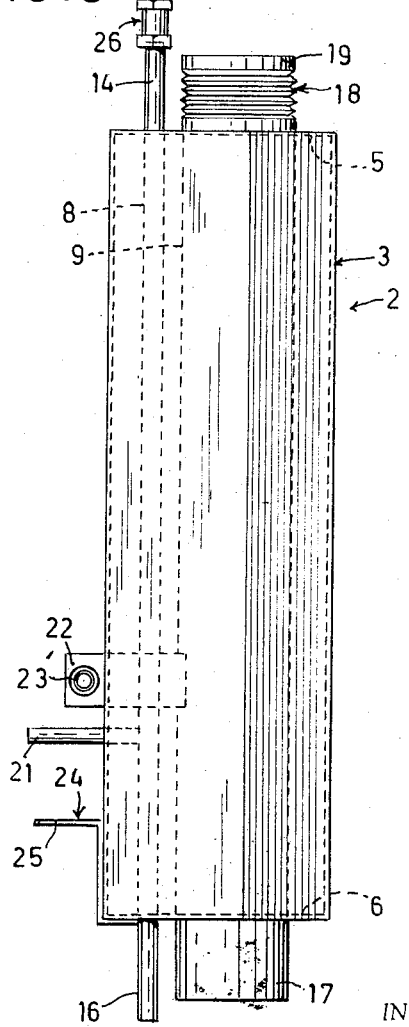

DUCT ASSEMBLY UNIT FOR AIR-WATER INDUCTION SYSTEM OF AIR CONDITIONING IN MULTI-STORY BUILDINGS

SUMMARY

One of the objects of the invention is the provision of modular units, each being an assembly of water pipes and an air duct in an air-water induction type air conditioning system for a multi-story building enabling the quick installation of such pipes at any time after the floors are positioned irrespective of the order in which the floors are made.

Another object of the invention is the provision of a module or assembly of pipes (which includes water pipes and an air duct) in an air conditioning system for a multi-story building including a housing for enclosure of the portion of such pipes that extends between each floor against access of atmospheric air thereto, and also enclosing heat insulation material insulating said pipes from each other and from the housing, and which unit, in addition, has supporting and positioning means for supporting and positioning the unit or module during installation, one support being provided for each story whereby each floor will support one unit.

A still further object of the invention is the provision of a modular arrangement of an induction system for air conditioning in a multi-story building in which each module comprises a unitary assembly of the pipes, and take offs for terminal equipment on each floor and which system enables far greater economy in the installation and maintenance of air conditioning systems of the induction type than heretofore.

An additional object is the provision of an improved method of installing an induction system in a multi-story or multi-room building.

Other objects and advantages will appear in the description and drawings.

DESCRIPTION OF DRAWINGS

FIG. 1 is a side elevation of a plurality of adjacent pairs of units or modules of air induction type air conditioning system, showing the units supported in position on the several floors.

FIG. 2 is an enlarged isometric view of one of the units or modules of FIG. 1.

FIG. 3 is a side-elevational view of the module of FIG. 2 as seen from one side.

FIG. 4 is a cross-sectional view along line 4—4 of FIG. 3.

FIG. 5 is a side-elevational view of the unit shown in FIG. 3 as viewed at a right angle to FIG. 3.

FIG. 6 is an enlarged cross-sectional view of a coupling connecting one of the adjacent ends of one of the water pipes extending through an adjacent pair of units.

DETAILED DESCRIPTION

The present invention is not concerned with the central plant for supplying air and water. Normally the central plant is at the top or bottom of the building, and while a two water pipe arrangement is illustrated, the invention is not limited to the two-pipe arrangement for water. It is equally adapted to a three or four pipe arrangement, according to whether or not separate pipes are for the chilled and heated water, or the same pipes are used.

In the description, the word "floor," as used, may include the floor for the area above it and the ceiling structure for the area therebelow. Thus the units hereinafter described extend between the adjacent floors, and each is supported on one of the floors of the building.

Several stories or floors of a multi-story building, each generally designated 1, are shown in FIG. 1.

Each unit of the present invention is generally designated 2 and comprises an elongated tubular metal housing, generally designated 3, having side walls 4 and upper and lower end walls 5, 6. The cross-sectional contour of the housing may vary according to the number of water pipes used, whether two, three or four, or by reason of other specifications.

A pair of cylindrical water pipes, generally designated 7, 8, extend through the housing 3 longitudinally of the latter, said pipes being spaced from each other and from the side walls of the housing 3. Pipes 7, 8 provide for circulation of the water to and from the central plant.

A cylindrical air duct 9, of substantially larger diameter than that of the pipes 7, 8, also extends through housing 3 parallel with pipes 7, 8, and is spaced from the latter and from the side walls 4. The terminal end portions of pipes 7, 8 and duct 9, project outwardly of opposite ends of the housing 3, extending through openings in the end walls 5, 6 and to which end walls said pipes and duct are secured in sealed relation as by solder or welding, and end walls 5, 6 are secured to the ends of the side walls in the same manner. Thus the end walls support the pipes and ducts stationary relative to each other and to the housing.

Heat insulation material 10 (FIG. 4) such as fiberglass, fills the interior of housing 3, extending around each of the water pipes and the air duct.

The projecting terminal end portions of pipes 7, 8 at one of the ends of the housing 3, are designated 13, 14 and are designated 15, 16 at the opposite end. Said terminal end portions are preferably unthreaded.

One of the projecting terminal end portions 17 of the air duct 9 is unthreaded, while opposite terminal end portion, also unthreaded, includes a bellows or sylphon-like coupling 18 element that is extensible longitudinally of the duct as well as being flexible. Said coupling 18 has an annular collar 19 at its terminal outer end, the inside diameter of which is adapted to closely receive the terminal end portion 17 of the air duct of adjacent unit 2 when a pair of units are in longitudinal alignment.

From the foregoing it is seen that the pipes 7, 8 and air duct 9 are rigid with the housing 3 with the end walls of the housing positioning the pipes and duct and supporting them at a unit with the housing.

Outlet and inlet branches or stud-outs 20, 21 connect by suitable T's with pipes 7, 8 within the housing 3, extend through openings in one side wall of housing 3, projecting outwardly from said wall for coupling with pipes from a conventional induction unit. These stud-outs are in sealed relation to the wall through which they extend, so the interior of the housing is enclosed against ingress of atmospheric air.

A hollow rectangular air take-off fitting 22 is secured at one end to the duct 9 within the housing 2 and projects through the wall of the housing adjacent to the pipe stud-outs 20, 21. The end of the fitting 22, secured to the duct, opens into the latter, while the two opposite sides of the outwardly-projecting portion of the fitting are formed with aligned openings in which one of the ends of duct take-offs 23, 24 are secured. The fitting 22 is secured air tight to the wall 4 of the housing through which it extends. The duct take-offs 23, 23' may connect with induction units in the area to be air conditioned.

The wall 4 through which the fitting 22 and pipe stud-outs extend normally faces into the area to be air-conditioned, and a right angle floor bracket 24 is secured to said side wall below the stud-outs 20, 21, and duct take-offs. Said bracket 24 has a horizontal shelf 25 that projects at a right angle from the wall to which the bracket is secured which shelf is adapted to support the unit 2 vertically on the floor 1 with the lower end of the housing preferably projecting downwardly past the upper surface of the floor but spaced above the ceiling structure that defines the lower surface of the floor, while the upper end of each unit preferably extends past the plane of the ceiling structure.

The specifications of the building will determine the position of the supporting bracket, but in any event, it will support each unit in its proper position for coupling the adjacent ends of the units together, and when so spaced, the terminal ends of the housings of adjacent pairs of modules will usually be approximately 18 inches apart providing ample room for coupling the pipes and air ducts.

In installing the units, adjacent pairs are supported on the floors in their proper positions as determined by the building specifications, one unit above the other. The pipes 7, 8 of the units will be in alignment as will the ducts 9.

Assuming the flexible couplings 18 of the air ducts are at the upper ends of each adjacent pair with the terminal end portions 13, 14 also at the upper end, said portions 13, 14 may each have a sleeve coupling 26 slidably supported thereon. Each sleeve coupling has a suitable plastic or NEOPRENE liner 27 (FIG. 6) adapted to form an air-tight seal with the lower projecting end portions 15, 16 of the adjacent unit 2 upon sliding the sleeve over said portions 15, 16 and tightening nuts 28 on the tapered ends of said sleeve to apply radial pressure of the lever against the portions 13, 14 and 15, 16 that project into the sleeves 26.

The collar 19 on the flexible coupling 19 is extended upwardly to fit over the lower projecting end 17 of the unit 2 thereabove after which said collar may be secured by epoxy cement, or in any other suitable manner to said end portion 17.

After the couplings are made, the terminal end portions of the pipes and air ducts are enclosed in heat insulation material.

In this manner the water pipes and air ducts of the induction air conditioning system may be quickly and accurately installed without the expensive, time-consuming practice of pipe cutting, threading, supporting, and connecting the water pipes, and air ducts, and thereafter insulating the pipes and ducts between floors. Also, in the present structure, the condensation of moisture on the pipes due to access of atmospheric air of high humidity to the portions of the pipes and ducts extending between the floors is substantially avoided, as the housing 3 is substantially air tight.

I claim:

1. A modular unit for air and water in an induction system of air conditioning in a multi-story building, said stories being defined by adjacent pairs of spaced floors one above the other, said unit comprising:
   a. a plurality of parallel pipes for water, and an air duct, in spaced side-by-side relation having intermediate portions adapted to extend vertically between each adjacent pair of such spaced floors,
   b. an elongated housing having side walls extending longitudinally of said pipes and duct and around the intermediate portions of said plurality of pipes and said duct enclosing them, and opposite end walls on said housing closing the ends thereof and supporting said pipes and air duct in said spaced relation to each other and from said side walls,
   c. heat insulation material with said housing insulating said pipes and said air duct from each other and from said side walls,
   d. pipe stud-outs on said pipes and an outlet fitting on said duct extending laterally from said pipes and duct and through one of said side walls in sealed relation thereto conducting water to and from an induction unit and for conducting air to such induction unit,
   e. terminal end portions of said pipes and said air duct extending through said end walls in sealed relation thereto and projecting outwardly therefrom,
   f. supporting and positioning means on said housing for supporting the latter vertically on one of said floors in a position with said terminal end portions exposed and in longitudinal alignment with adjacent modular units of corresponding structure to be supported on adjacent floors, and for connecting said terminal end portions with the terminal end portions of modules supported on such adjacent floors, and
   g. coupling elements for so connecting said terminal end portions with the adjacent terminal end portions on the modules to be supported on said adjacent floors.

2. In a modular unit as defined in claim 1;
   h. said coupling elements being extensible longitudinally of said pipes and ducts for movements from retracted positions on said terminal end portions disconnected from adjacent terminal end portions to be connected therewith, to extended positions connected with such adjacent terminal end portions,
   i. the coupling element for connecting said air duct with the terminal end portion of an adjacent module when in longitudinal alignment therewith, comprising a sylphon-like sleeve that is also laterally flexible.

3. In a modular unit as defined in claim 1;
   h. said supporting means comprising a member rigid on said housing projecting laterally therefrom for extending over and in engagement with one of said floors.

4. In a multi-story building having a plurality of vertically spaced floor structures defining the upper and lower limits of each story, the combination therewith comprising:
   a. a plurality of vertically elongated, separate modular units in vertical alignment, each unit comprising a plurality of parallel pipes for water and an air duct in spaced, side-by-side relation having intermediate portions extending between the adjacent floor structures of each story,
   b. an elongated housing having side walls extending longitudinally of said pipes and ducts of each modular unit and around said intermediate portions enclosing them, and opposite end walls on each housing closing the ends thereof and supporting the pipes and duct within each housing spaced from each other and from said side walls,
   c. heat insulation material within each housing insulating said pipes and said air duct from each other and from said side walls,
   d. pipe stud-outs on said pipes and an outlet fitting on said air duct within each housing extending laterally from said pipes and duct through one of said side walls in sealed relation thereto for conducting water from said pipes to an induction unit and for conducting water to such induction unit,
   e. said pipes and said air duct having terminal end portions projecting longitudinally therefrom through said end walls in sealed relation thereto and projecting outwardly therefrom into the laterally projected area of each floor structure with the air pipes and ducts so extending into said laterally projecting area being respectively in longitudinal alignment for coupling together of corresponding pipes and ducts,
   f. supporting means on each module for supporting the weight of each module on one of said floors and for positioning each module with its terminal end portions projecting a predetermined distance into said laterally-projected area,
   g. coupling means within the laterally-projected area of each floor structure for coupling the pipes and duct of each unit with the corresponding pipes and duct of adjacent units.

5. In a combination as defined in claim 4;
   h. the coupling means for said ducts comprising a sylphon-like tubular element on one of the terminal end portions of each modular unit,
   i. said end walls securing the pipes and the air duct rigid with the side walls of each unit,
   j. said supporting means comprising a laterally projecting bracket rigid on each housing adapted to extend over one of said adjacent floor structures.

6. The method of installing the water pipes and air duct of an induction air conditioning system in a multi-story building that includes the steps of:
   a. supporting and enclosing a similar set of heat-insulated water pipes and an air duct within each of a plurality of separate elongated housing each being of a length approximately equal to the vertical distance between adjacent floors of said stories, and with the terminal end portions of each pipes and the air duct in each housing projecting a distance outwardly of each end thereof that is small compared to the length of each housing, whereby each housing including the set of pipes and the air conduit therein forms a module in the air-water conducting portion of the system, b. supporting one of said modules on each floor of said building independently of the others with said housing extending across the space between an adjacent pair of floors and with the terminal end portions of the air duct therein respectively in longitudinal alignment with the terminal end portions of the pipes and the terminal end portions of the modules adjacent thereto, then c. coupling said adjacent terminal end portions together.

* * * * *